United States Patent
Weiß et al.

(10) Patent No.: US 10,891,726 B2
(45) Date of Patent: Jan. 12, 2021

(54) SEAL TAMPER DETECTION

(71) Applicant: Authentic Vision GmbH, Salzburg (AT)

(72) Inventors: Thomas Weiß, Salzburg (AT); Thomas Bergmüller, Salzburg (AT)

(73) Assignee: Authentic Vision GmbH, Salzburg (AT)

( * ) Notice: Subject to any disclaimer, the term of this patent is extended or adjusted under 35 U.S.C. 154(b) by 0 days.

(21) Appl. No.: 16/061,282

(22) PCT Filed: Dec. 9, 2016

(86) PCT No.: PCT/EP2016/080399
§ 371 (c)(1),
(2) Date: Jun. 11, 2018

(87) PCT Pub. No.: WO2017/097962
PCT Pub. Date: Jun. 15, 2017

(65) Prior Publication Data
US 2018/0365818 A1   Dec. 20, 2018

(30) Foreign Application Priority Data

Dec. 11, 2015 (EP) .................................... 15199607

(51) Int. Cl.
| | |
|---|---|
| *G06T 7/00* | (2017.01) |
| *B65D 55/08* | (2006.01) |
| *G06T 7/60* | (2017.01) |
| *G06T 7/62* | (2017.01) |
| *G06T 7/73* | (2017.01) |

(52) U.S. Cl.
CPC .......... *G06T 7/001* (2013.01); *B65D 55/0818* (2013.01); *G06T 7/0008* (2013.01); *G06T 7/60* (2013.01); *G06T 7/62* (2017.01); *G06T 7/74* (2017.01); *G06T 2207/30204* (2013.01)

(58) Field of Classification Search
CPC .. G06T 7/001; G06T 7/60; G06T 7/74; G06T 7/62; G06T 7/0008; G06T 2207/30204; B65D 55/0818
USPC ......................................................... 382/143
See application file for complete search history.

(56) References Cited

U.S. PATENT DOCUMENTS

| | | | |
|---|---|---|---|
| 2001/0016059 A1* | 8/2001 | Krahn ................ | G01N 21/9508 382/141 |
| 2003/0098357 A1 | 5/2003 | Cummings et al. | |

FOREIGN PATENT DOCUMENTS

| | | |
|---|---|---|
| DE | 102011083900 A1 | 4/2013 |
| EP | 2709035 A2 | 3/2014 |
| WO | 2007055658 A1 | 5/2007 |

(Continued)

OTHER PUBLICATIONS

European Office Action Application No. 15199607.1 dated Sep. 19, 2016;Completed: May 17, 2016 9 pages.

(Continued)

*Primary Examiner* — Amandeep Saini
(74) *Attorney, Agent, or Firm* — Whitmyer IP Group LLC (57) ABSTRACT

Method and system for confirming the integrity of a tamper-evident seal based on a comparison of the value of at least one parameter describing the physical structure of a predetermined breaking point provided in the seal, which value is determined from at least one captured image of the seal, with a pre-determined reference parameter value.

19 Claims, 5 Drawing Sheets

(56) References Cited

FOREIGN PATENT DOCUMENTS

WO    2015177451 A1    11/2015

OTHER PUBLICATIONS

International Search Report Application No. PCT/EP2016/080399 Completed: Mar. 10, 2017; dated May 23, 2017 6 pages.
Nagaya Yet al: "Crack shape reconstruction using ECT camera system", SICE 2004 Annual Conference, IEEE, Piscataway, NJ, USA, vol. 3, Aug. 4, 2004 (Aug. 4, 2004), pp. 2760-2763.
Written Opinion of the International Searching Authority Application No. PCT/EP2016/080399 dated May 19, 2017 9 pages.

* cited by examiner

SEAL TAMPER DETECTION

TECHNICAL FIELD

The present teaching concerns a method and a system for confirming the integrity of a tamper-evident seal, the seal as such and a batch thereof, as well as a computer program product implementing said method.

BACKGROUND

More specifically it concerns a method comprising: capturing at least one image of a seal whose integrity is to be confirmed; determining the value of at least one parameter describing the physical structure of the seal from the at least one captured image; comparing the determined parameter value with a pre-determined reference parameter value; and confirming the integrity of the seal when the compared parameter values match. Correspondingly the system comprises an image capturing means and a computing means connected to the image capturing means, wherein the computing means is configured to receive at least one captured image from the image capturing means, determine the value of at least one parameter describing the physical structure of the seal from the at least one captured image, compare the determined parameter value with a pre-determined reference parameter value and confirm the integrity of the seal when the compared parameter values match.

Tamper-evident seals are commonly used on products or their packaging when the authenticity and integrity of the product is a valuable property of the product. Aside from the important, but independent problem of seal forgery, the only possibility to disrupt the integrity of a sealed product is by breaking the seal in a way that goes unrecognized. A prominent use-case is the refilling of authentic spirits bottles with counterfeit liquor. In this case the seal should serve as a refill protection. The seal may either act as a physical refill protection itself or it may serve to confirm the authenticity and integrity of a dedicated anti-refill closure. In the latter case the refill stop or barrier is provided by the closure (e.g. a capsule) and the seal ensures that only authentic closures are used and that the closures are not manipulated.

In many applications it is possible to break a seal in a way that goes highly undetected. This is possible due to the fact that often a seal can be broken unobtrusively, which is not necessarily detected on first sight and would require a very close inspection. A sufficient inspection is in many cases impractical or requires pre-knowledge or a specially trained examiner. Therefore in many cases a broken seal is not recognized as being broken by the untrained examiner, because he simply doesn't know how to tell a broken from an unbroken seal.

Coming back to the liquor-use case, the most common method to protect the content is to provide tamper-evident seals, which are completely destroyed when opening a packaging or bottle, such that it is very obvious when the packaging or bottle is opened in the usual way (e.g. by unscrewing a capsule) and the seal thus broken. However such seals can often be tricked by a "clean cut"-method: depending on the technology used for sealing and/or confirming the seal, it might well be possible to cut open the seal with a razor blade (where the cut is hardly visible if not invisible to the naked eye), empty the authentic content, refill it with counterfeit liquor and cover up the razor cut. The untrained or inattentive consumer will usually not recognize the covered-up cut and think the seal is still intact.

To alleviate the inherent problem of untrained seal-examiners, it is almost mandatory to provide a machine-aided seal-verification system to evaluate the integrity, preferably together with the authenticity, of the seal.

Different types of such seal-verification systems have been suggested. One type providing for a simple verification is based on an electronically enhanced seal, i.e. the seal comprising a circuitry for determining the integrity of the seal and for communicating the current status to an electronic readout device. Examples are the bottle seal disclosed in WO 2015/177451 A1, which can be read out via NFC, or the refill protection shown in EP 2 709 035 A1, which uses an RFID protocol for readout. The disadvantage of this type of systems is that a complex and thus costly seal is required on the product. Therefore the overall cost of using this type of protection is relatively high and may not be justified in a lot of applications.

Another type of seal-verification system is based on optically read-out seals. US 2003/0098357 A1 discloses multiple options for implementing a tamper-indication bar-code. It describes applications based on particle containing gels, inks or adhesives, based on ytterbium-yttrium-erbium oxide nanoparticles as the most secure option, followed by refractive coating of the bar-code, e.g. in the form of holographic or prismatic materials, and finally deformable substrates such as flexible films for carrying the bar-code as the most inexpensive but also least secure option. The solution based on nanoparticles hardly alleviates the disadvantages of electronic seals regarding the necessary readout equipment, but rather requires even less common detectors. All of the security measures presented in US 2003/0098357 A1 are based on the detection of a two-dimensional deformation of the seal. If the seal is broken with a clean cut, e.g. using a scalpel, the two-dimensional deformation can be reduced to a minimum and thus escape detection. As a further disadvantage of the known method, the attacker may freely choose the position where the cut is to be placed and in particular may pick a position and orientation at which an inherently lower chance of detection of the cut is known.

Another method for optical seal verification is disclosed in WO 2007/055658 A1, which concerns seals for covering the lens of portable cameras before allowing them to be taken into a secure area. By verifying the seal at the exit, it can be determined whether the camera has been used in the secure area and further examination can be conducted if necessary. As the seals do not have any predetermined breaking points, the seal verification must rely on a very general comparison of two photographs. Therefore this method has the same weaknesses that have been discussed above for US 2003/0098357 A1.

SUMMARY

One object of the present teaching is to overcome or at least alleviate the disadvantages of the known seal technology.

The method according to the present teaching is characterized in that the parameter used for evaluating the integrity of the seal describes the physical structure of a predetermined breaking point provided in the seal. In use, the seal is placed on the sealed object such that the predetermined breaking point must be broken in order to access the object. The attacker seeking to access the object must therefore disrupt the seal at the predetermined breaking point, i.e. the predetermined breaking point is the only viable position for cutting the seal. The nature of the predetermined breaking point is such that the seal has an increased fragility at the predetermined breaking point. Preferably the seal will be ruptured at the predetermined breaking point when a cut is applied at a different position either already when performing the cut (due to significantly increased rigidity of the seal compared to the predetermined breaking point position) or upon accessing the sealed object (due to separation of parts of the seal on both sides of the predetermined breaking point). The advantage of the present teaching results from the properties of the predetermined breaking point as causing an irreversible structural change of the seal when being broken and from focusing on the localization of a possible rupture at the predetermined breaking point. By means of the structure and application of the seal, the attacker is forced to open the seal at the predetermined breaking point. At the same time the physical structure of the predetermined breaking point is determined and governed by the connection and the connecting forces between the parts of the seal in the vicinity of the predetermined breaking point. Without the connection, the physical structure cannot be re-established, thus inevitably facilitating detection of the broken seal. When confirming the integrity of the seal, the step of capturing at least one image of the seal does not mean that the at least one captured image must comprise an image of the entire seal. Instead, within the present method capturing an image of at least a part of the seal, wherein the predetermined breaking point at least partially extends into said part, can be sufficient for determining the value of the at least one parameter describing the physical structure of the predetermined breaking point provided in the seal. Also within the scope of the present teaching, the parameter describing the physical structure of the seal, and specifically the predetermined breaking point, can be associated to a three-dimensional physical property. Therefore the method may comprise the capturing of two or more images, e.g. in order to more comprehensively represent the three-dimensional property.

In the present context the term "predetermined breaking point" (sometimes also simply break point) is used to denominate a single spot on a seal, a course running across at least parts of a seal or a region formed by a part of the seal. The seal can be a label or a part of a label, which can be attached (preferably in a tamper evident way, e.g. by using special adhesives that prevent removal of the intact seal) to an object in order to seal the object; it can be a closure or cap or a part of a closure or cap on a container, which is connected to the container; it can also be a general area of a packaging of an object that prevents opening of the packaging. At the location, course or area forming the predetermined breaking point, the seal has a relatively decreased structural rigidity. The predetermined breaking point or rated break point therefore defines a location on the seal where the seal is prone to rupture. There are several known possibilities to produce a predetermined breaking point, which naturally depend on the material and overall structure of the seal. For example a predetermined breaking point may be achieved by decreasing material strength, by thinning of the seal material, by otherwise weakening the inner structure of the seal material (e.g. by pre-stressing the material or by applying weakening agents), and/or by weakening the overall structure of the seal at the predetermined breaking point (e.g. by providing partial cuts, notches and/or perforations). Consequently, the parameter describing the physical structure of the predetermined breaking point is adapted to the nature of the predetermined breaking point. It is a parameter that is related to the state of the predetermined breaking point, i.e. the parameter assumes different parameter values depending on whether the predetermined breaking point is physically intact or not. The process of confirming the integrity of a tamper-evident seal is thus equivalent to detecting whether the seal is broken (or not) and providing the detected result, e.g. for information of a user.

Especially where the type of the predetermined breaking point used is such that depending on its position, it may lead to an open seal (e.g. combining several cuts in a row across the seal), in order to differentiate legitimate predetermined breaking points from defects of the seal caused by an attacker, it is advantageous if the parameter describes a position of the predetermined breaking point relative to at least one marking on the seal or on an object, when the seal is applied to said object.

Preferably, the predetermined breaking point is a perforation provided in the seal and the parameter describes the physical structure of the perforation. The physical structure of the perforation is easily accessible to optical detection and verification, e.g. by tracing the edges of the perforation across the seal. A perforation is also relatively easy and cheap in production of the seal. It can be combined with different, even mixed seal materials. It can be applied irrespective of the surface design of the seal, i.e. the seal surface can be used for providing proof of authenticity or the like. Moreover the perforation can be created even after application of the seal to the sealed object, thus providing for easy and reproducible (depending on the production method, see below) positioning of the predetermined breaking point with respect to the object.

When the predetermined breaking point is formed by a perforation, the at least one parameter preferably includes one or more of a length of the perforation, a width of the perforation, an offset of the perforation with respect to an edge of or marker on the seal, or a code embedded in the structure of the perforation, preferably by a sequence of long and short cuts, as explained in more detail below in connection with the possibly irregular shape of the perforation. Since in this instance the edge and shape of the perforation are the most vulnerable parts of the seal with respect to structural modifications, by determining and verifying the above parameters of the perforation, even minor damages to the seal can be detected.

In an advantageous embodiment of the present teaching, before capturing at least one image of the seal according to the above method, the predetermined breaking point is produced in the seal according to a predefined value of the parameter describing the physical structure of the predetermined breaking point, wherein the predefined value is stored as the reference parameter value for comparison with the later determined parameter value describing the physical structure of a predetermined breaking point. In practice the predefined value can be stored in a database holding reference parameter values for all produced seals and which can be accessed via a data network. The customized production of the predetermined breaking point is particularly useful when the parameter value varies between multiple produced seals.

For instance, the parameter value can be pseudo-randomized, avoiding as good as possible repetition and predictability of the parameter value. In this case each seal may be unique with regard to the physical structure of the predetermined breaking point. An attacker cannot be certain of the success of a manipulated seal until detection. At the same time, verification attempts can be designed to be traceable based on access to the specific reference parameter value.

Alternatively, the parameter value can be based on real, i.e. stochastic, randomness, e.g. through manufacturing tolerances. For instance in the above situation where the perforation is produced after application of the seal to the sealed object, the seal itself may be off-set on the object (product or packaging) due to tolerances in manufacturing and application. As a consequence, the position of the predetermined breaking point relative to a marker on the seal is random and the random position of the predetermined breaking point with respect to the marker can be evaluated and used as a parameter of the physical structure of the predetermined breaking point. Its value, e.g. the value of the distance to a reference mark or edge, will then be stored as reference parameter value after production of the predetermined breaking point. In this case the shape of the perforation itself may only have small manufacturing tolerances, which would render it less suitable for use as a random parameter.

The above method of producing variable or randomly structured predetermined breaking points can be implemented easily with perforations created by a generally available laser knife. With a laser, the perforations can be produced in a precise yet fast manner, while the laser can be configured to produce different perforations on each pass. An advantage when producing the breaking point according to a predefined specification in this manner is that the reference parameter value is known before the breaking point is actually produced. Hence a registration of the reference parameter value does not require a separate read-out step subsequent to the production of the breaking point. Of course the above method is not to be regarded as the only way to produce the perforation or generally a predetermined breaking point. In general the inventive method can also be applied when the shape of the perforation is fixed for each pass, e.g. when the same rigid perforation tool is used for producing the perforation. A customized perforation structure is only one possible variation of the method in order to achieve an increased security.

Therefore within the scope of the present teaching is also a tamper-evident seal (e.g. formed by a (security) label, or a part thereof, a closure, a cap or an area/part of packaging as discussed above) having a predetermined breaking point formed by at least one perforation of the seal, wherein the perforation has an irregular shape. The shape of the perforation is a parameter describing the physical structure of the perforation forming the predetermined breaking point of the seal. Based on the irregularity of the shape, it will be harder for the attacker to reassemble the broken seal and thereby forge the integrity of the seal. Especially when using a customized shape irregularity, producing fake seals with the same (unpredictable) identifier and/or parameters requires at least accessing (e.g. seeing) and registering the original seal before being in a position to produce a fake duplicate. This significantly increases the required effort. For providing further improved security, the seal may comprise a VOID material, for example the "'VOID' security film" available from "Lintec Graphic Films Ltd.". By virtue of the VOID material the seal can change color or unveil a special pattern or irreversible marking on the product or packaging protected by the seal when the seal is broken or manipulated. Based on one of these effects, the modification of the seal will be easily detectable in the at least one captured image and it will be recognized that the seal has been broken.

In one preferred embodiment the irregularity is achieved in that the predetermined breaking point is formed by two or more perforations of the seal, wherein at least two of the perforations have different physical dimensions, in particular a different length and/or width.

With regard to a batch of tamper-evident seals, it is advantageous if the seals each have a predetermined breaking point formed by at least one perforation of the seal, wherein the position (or offset) of the at least one perforation relative to a border of the seal or relative to a marking on the seal varies between different seals of the batch.

The above-described features of tamper-evident seal, due to the presence and the properties of its predetermined breaking point, are specifically designed for use within the present method, because the method is based on a seal having a predetermined breaking point and provides improved safety (i.e. protection against tampering) when the seal has the specific properties defined above. The improved safety is a combined effect, which is achieved when using the present method with the inventive seal. This technical relationship between the method for confirming the integrity of the seal and the seal as such is not negated by virtue of the fact that the method is not restricted to seals having irregularly shaped perforations and can be applied to different types of predetermined breaking points as explained above.

Regarding again the present method, alternatively to producing the breaking point with predefined structural parameter values, the predetermined breaking point can also be produced in an uncontrolled random fashion. In this case the present method further comprises the steps of recording the reference parameter value for each seal by: capturing at least one reference image of the seal; determining at least one reference parameter value describing the physical structure of the seal from the at least one captured reference image; and storing the determined reference parameter value. As above, the reference parameter value can be stored in a central database and accessed during verification.

Irrespective of whether the reference parameter value is predefined or recorded separately, in order to allow for a fast and easy access of the reference parameter value, the reference parameter value can be associated with an identification of the seal or a sealed object and stored in a central database, from which the reference parameter value is fetched based on said identification before confirming the integrity of the seal.

Correspondingly, each seal preferably has an identification feature such as a serial number. The database holding the reference parameter values for each seal can thus store an association with the identification feature such that upon verification of the seal, the reference parameter value can be queried based on that feature.

Moreover based on the identification feature, it upon verification of a seal, the detected integrity state of each identified seal (i.e. broken or intact) may preferably be stored in a central location. The additional information of the last observed integrity state associated with the identification feature can then be used to detect unauthorized replicates of a seal, where the seal is still intact but in fact has lost its protective function because the entire seal including the identification feature has been replaced (with the replicate).

The overall security of the seal can be increased even further if the identification feature is unpredictable or unguessable, e.g. digitally signed or encrypted. This is of special importance if non-customized predetermined breaking points or parameters having only a relatively small variation compared to the number of seals, i.e. where increasing serial numbers may share the same physical breaking point properties, are used. With unpredictable identifiers it is significantly harder to come up with or guess unseen replicates of seals.

In addition the identification feature and/or additional security features can be used to authenticate the seal, i.e. to discern authentic seals from forged or fake replicates. In this case the verification of the seal may provide additional information to the user regarding the authenticity (besides reporting the integrity). In this case the seal and the present method may be used to confirm the authenticity also of a broken seal. The security of the identification feature and/or security feature may be enhanced based on known methods, such as described in WO2013/188897A1 or WO2015/079014A1.

When the perforation has a generally irregular shape and/or is individualized for each tamper-evident seal, as described above, the perforation or in general the predetermined breaking point formed by the perforation are used effectively as data carrier or data storage medium. Especially where the shape is produced according to a predefined parameter value or a set of predefined parameter values, the predetermined breaking point essentially comprises a physical encoding of the parameter values. In other words, the predetermined breaking point, in particular a perforation, can be used to carry a code. This code could be, optionally together with the identifier (and/or additional information), digitally signed and verified using a generally known private/public key procedure.

Furthermore a system as defined in the outset is provided within the scope of the present teaching with advantages corresponding to the above-described method, wherein the computing means (e.g. comprising a processor and memory) is configured to determine and compare a parameter value describing the physical structure of a predetermined breaking point provided in the seal. Preferably, the computing means is configured to determine a position of the predetermined breaking point relative to at least one marking on the seal or on an object, when the seal is applied to said object, from the at least one captured image. In a further preferred embodiment the computing means is configured to determine at least one parameter value describing the physical structure of a perforation of the seal, in particular one or more of a length of the perforation, a width of the perforation and an offset of the perforation with respect to an edge of or a marker on the seal, or a code embedded in the structure of the perforation, preferably by a sequence of long and short cuts, from the at least one captured image. Preferably the image capturing means and optionally the computing means can be part(s) of a mobile device (e.g. a smartphone, tablet, etc.) and the verification means is separate from the mobile device and the mobile device comprises communicating means connected to the computing means and configured to establish a connection to the verification means via a data network, wherein the verification means is configured to receive the reference parameter value from a central database. Alternatively the verification means may be part of the mobile device and configured to download the reference parameter value from a central database to the mobile device. In a further alternative, the computing means may be separate from the mobile device (e.g. service-side), wherein the at least one captured image may be transmitted from the capturing means to the computing means by upload, e.g. via a wireless data network. This last embodiment can be advantageous when the capabilities of the mobile device are very limited (e.g. with feature phones).

Finally the present teaching is also directed to a computer program product that can be loaded directly into the internal memory of a digital computer and comprises software modules for executing the steps of the method as described in detail above when the product is running on a computer.

BRIEF DESCRIPTION OF THE DRAWINGS

The present teaching will be defined in more detail below by means of preferred exemplary embodiments, to which it is not to be limited to, however, and with reference to the drawings. In detail.

DETAILED DESCRIPTION

Figure 1A:
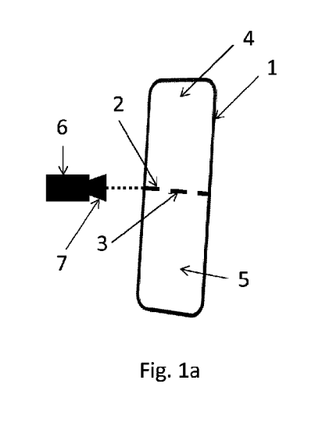
FIGS. 1a and 1b schematically show a use-case for confirming or denying the integrity of a tamper-evident seal.
Figure 1B:
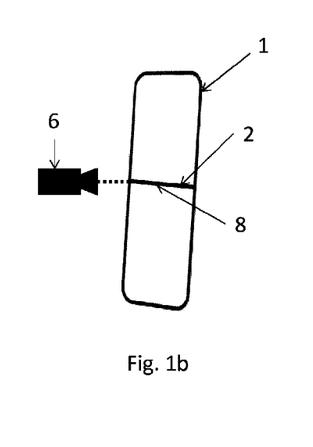

FIG. 1a shows a tamper-evident seal 1 formed by a security label. The seal 1 has a predetermined breaking point 2. The predetermined breaking point 2 of the seal 1 is formed by a perforation 3 running across the seal 1 between the longer edges of the security label, effectively dividing the seal 1 into a first part 4 and a second part 5. In the sealed state shown in FIG. 1a, the first part 4 and second part 5 are connected by and across the predetermined breaking point 2. The integrity of the seal can be confirmed using a mobile device 6 comprising a camera 7 and optical sensor as a capturing means. The mobile device 6 captures at least one image of a region of the seal 1 comprising the predetermined breaking point 2 and uses the at least one captured image for confirming the integrity of the seal 1. Specifically, the mobile device detects the cuts of the perforation and their respective lengths and distances. These parameters of the physical structure of the perforation are then compared with pre-determined reference parameters comprising accepted ranges for the number of cuts as well as their respective length and distance from a neighboring cut. If the determined number (three in this case), lengths or distances are within the accepted ranges, the integrity of the seal is confirmed by the mobile device 6. In the broken state of the seal shown in FIG. 1b, the first part 4 is separated from the second part 5. In this broken state the perforation 3 is formed by a single, continuous end-to-end cut 8 through the seal 1. The mobile device 6 therefore detects the single cut 8 and its length from the captured image. Consequently, the determined parameters are outside the accepted ranges (e.g. more than one cut was expected) and the integrity of the seal 1 cannot be confirmed. In the absence of a confirmation, a user of the mobile device 6 may perform one or more retries to verify the seal integrity. After a certain number (e.g. one, two, three, or more) of unsuccessful confirmation attempts (i.e. when a confirmation has been denied), the seal will be considered broken.

Figure 2A:
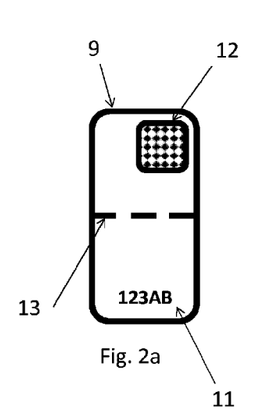
FIGS. 2a and 2b schematically illustrate differences between an authentic seal and a forged seal, which can be detected by the present method.
Figure 2B:
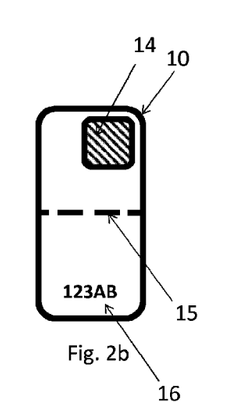

In FIG. 2a an authentic seal 9 is shown and in FIG. 2b a forged or fake seal 10 is shown. The authentic seal 9 comprises several security features 11, 12, 13. Specifically, the authentic seal 9 comprises an identification feature 11 in the form of a serial number. The serial number is preferably a unique, unguessable/unpredictable combination of numbers and letters, which can be used by the producer of the seal to trace certain aspects of the seal such as time and location of use. Consequently it is possible to determine the legitimacy of the seal from the serial number and the circumstances of its use. The authentic seal 9 further comprises an optically variable device (OVD) 12 in the form of a holographic signet on the seal as described in more detail in WO 2013/18897 A1. Because it is relatively difficult to copy an OVD, the use of an OVD on the seal discourages replication or at least significantly increases the necessary effort and cost. In FIG. 2a the OVD forms only a small part of the seal 9. Of course it is also possible to produce a seal where the OVD covers a significant portion of the seal. Finally, the predetermined breaking point 13 itself of the authentic seal 9 also acts as a security feature because of an embedded code, which is encoded in the parameters describing the physical structure of the perforation forming the predetermined breaking point 13. In this particular example, the embedded code is associated with the identification feature 11. It may for instance be an asymmetrically encrypted representation of the serial number. Alternatively the embedded code or the embedded code together with the serial number may be signed and applied to or associated with the seal or sealed object.

The fake seal 10 in FIG. 2b differs from the authentic seal 9 in that some of the security features have not been replicated accurately. Specifically, the pattern created by the forged OVD 14 differs from the pattern created by the authentic OVD 12. Also the physical structure of the predetermined breaking point 15 differs in that the perforation forming the predetermined breaking point 15 has a different number of cuts and the cuts have different lengths and distances. While the identification feature 16 has apparently been replicated accurately, it can be used to identify the forged seal based on the time and location of its use (e.g. when a serial number reserved for the European market is used on a product on the US market). Moreover the serial number used as the identification feature will no longer correspond to the other security features. In the above example, where the perforation encodes a representation of the serial number, due to the different shape of the perforation, the decrypted representation will not match the serial number of the forged seal and the forgery will be uncovered.

Figure 3:
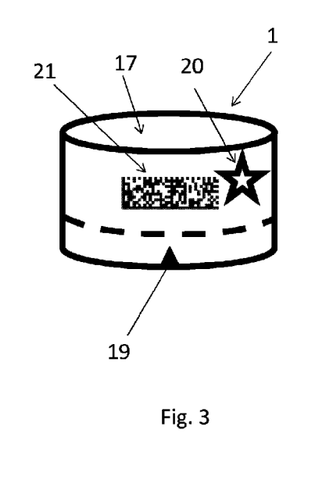
FIG. 3 schematically shows a seal in the form of a packaging comprising an identification feature as well as a security feature.
Figure 4:
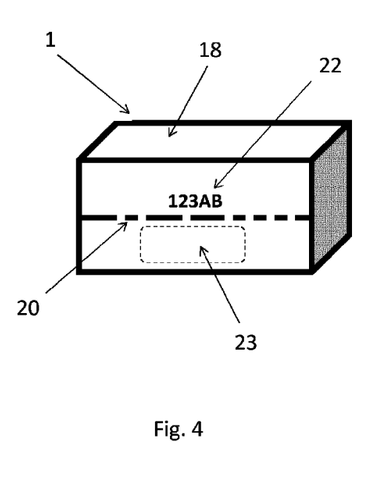
FIG. 4 schematically shows another seal in the form of a packaging comprising a different type of security feature than FIG. 4.

In FIGS. 3 and 4 the seal 1 is formed by a packaging 17, 18. The predetermined breaking points 19, 20 in the packaging 17, 18 are formed by perforations. In both embodiments, the packaging 17, 18 comprises additional security features in the form of an overt security marking 20 like a visible watermark or embossed image, in the form of an identification feature 21, 22 formed by a two-dimensional bar-code or QR-code, e.g. encoding a serial number or other unique identifier, or a human-readable code 22, or a security feature in the form of a covert security marking 23 like an invisible watermark or a marking applied using a security ink.

Figure 5A:
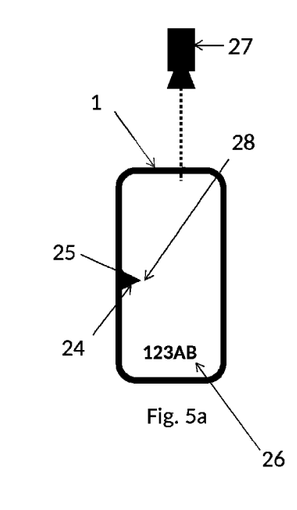
FIGS. 5a, 5b and 5c schematically show different states of a tamper-evident seal formed by a security label comprising a VOID material.
Figure 5B:
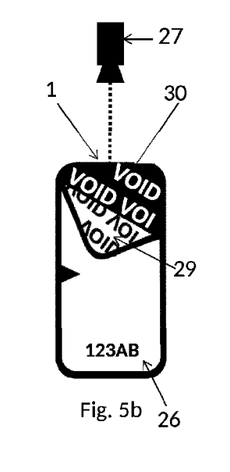
Figure 5C:
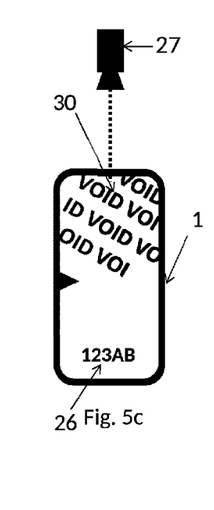

FIGS. 5a, 5b and 5c show different states of a tamper-evident seal 1 comprising a VOID material. The seal 1 has a predetermined breaking point 24 in the form of a notch 25 and can be identified via a serial number 26. In the validly sealed state shown in FIG. 5a the seal 1 is intact and the integrity of the seal can be confirmed with a mobile device 27 as described in connection with FIG. 1. In the embodiment shown in FIG. 5a, the parameter describing the physical structure of the predetermined breaking point 24 can be the edge length of the notch 25 and the angle between the edges. A more sensitive parameter would be the sharpness of the tip 28 of the notch 25, because the area around the tip 28 is the most fragile of the seal 1. Another usable parameter is the position of the notch with respect to the overall shape of the seal 1 or with respect to the serial number 26. As mentioned before, any combination of the parameters can be used to encode certain predefined information, which in turn can be linked to the serial number.

When confirming the integrity of the seal 1, the mobile device 27 can also analyze the general appearance of the seal surface with respect to color or two-dimensional markings. A tampering by peeling off the seal 1 can be detected based on the change of appearance of the seal 1 due to the VOID material as shown in FIGS. 5b and 5c. In FIG. 5b the color of the seal surface is changed in one part 29 of the seal, indicating that the respective part 29 has been subject to manipulation, e.g. separation of the seal 1 from the sealed product or packaging (not shown) has been attempted or performed. Alternatively or additionally, the VOID material may cause an irrevocable marking 30 of the seal 1 or of the product or package, as shown in FIG. 5b and FIG. 5c.

Figure 6:
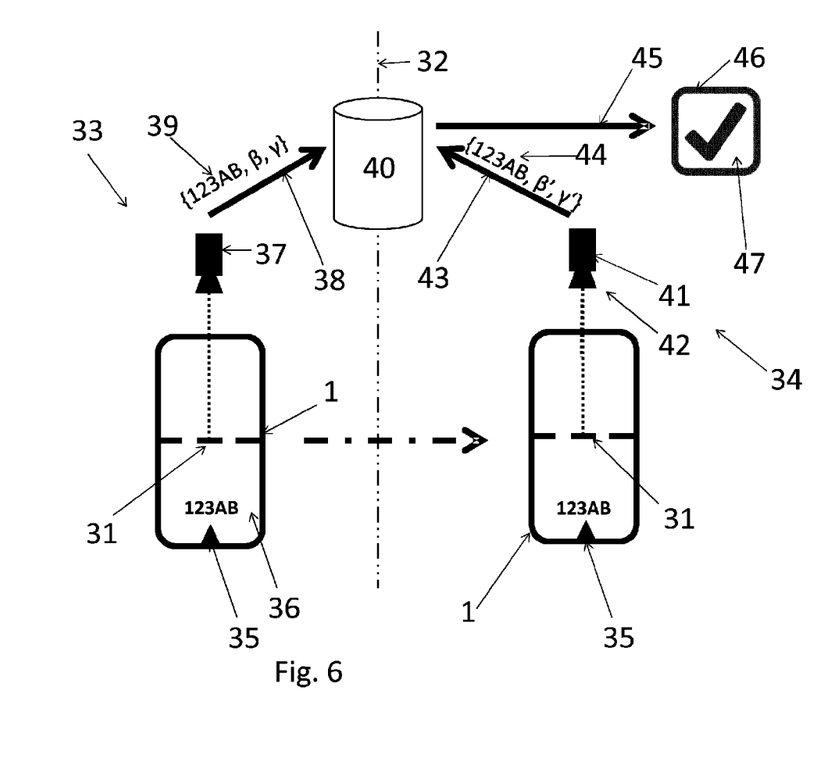
FIG. 6 schematically shows the steps of registering and confirming the integrity of a tamper-evident seal based on a reference parameter stored in a central database.

In a further embodiment, multiple predetermined breaking points may be provided in the tamper-evident seal 1. FIG. 6 shows the steps of capturing and registering reference parameters describing the physical structure of a first predetermined breaking point 31 of a seal 1. The vertical dashed line 32 separates the registration process 33 on the left from the verification process 34 on the right.

The registration process 33 serves to register two parameters $\beta$, $\gamma$ describing the physical structure of the predetermined breaking point 31 as reference parameters. Initially the seal 1 with a predetermined breaking point 31 having random parameters is provided. For example, the predetermined breaking point 31 may be produced in a random process, wherein the position and shape of the perforation forming the first predetermined breaking point 31 is governed by stochastically determined parameters. A second predetermined breaking point 35 in the form of a notch can be provided adjacent an identification feature 36 such that, when the second predetermined breaking point 35 is ruptured, the identification feature 36 will be destroyed or altered. A registration device 37 is configured to capture an image of the seal 1, in particular to capture the structure of the first predetermined breaking point 31 and the identification feature 36. From the captured image, the registration device 37 derives the serial number as well as the value of the two parameters $\beta$, $\gamma$ describing the physical structure of the predetermined breaking point 31. For example, one parameter $\beta$ may be the offset of the first cut of the perforation forming the predetermined breaking point 31 from the edge of the seal 1 and the other parameter $\gamma$ may be the length of the first cut of the perforation forming the predetermined breaking point 31. Other parameters may include the vertical offset of the predetermined breaking point 31 from the serial number 36, the angle between a line defined by the predetermined breaking point 31 and the connected edges of the seal, etc. The value of the parameters $\beta$, $\gamma$ may be determined by matching a predefined shape of the perforation with the captured image or generally by pattern recognition methods applied to the captured image. For instance one parameter $\beta$ may be a distance between the perforation forming the predetermined breaking point 31 and an edge of the seal 1 or a distance between the perforation forming the predetermined breaking point 31 and the notch forming the second predetermined breaking point 35. It may also be the distance measured between a first separate cut of the perforation and a reference as mentioned before. The other parameter γ may be a ratio between singular cuts of the perforation or their widths or a ratio between widths of singular cuts of the perforation.

When the serial number and the parameter values β, γ have been determined, the registration device 37 in an upload step 38 sends a message 39 comprising the serial number and the parameter values β, γ to a central database 40. The central database 40 stores the received serial number and the received parameter values β, γ in respective database tables. It further stores the relation between the serial number and the parameter values β, γ, such that the parameter values β, γ can be queried based on the serial number during verification.

The verification process 34 serves to confirm the integrity of the seal 1 by comparing the values of the two reference parameters β, γ stored in the database 40 with separately determined values of the same parameters determined by the mobile device 41 acting as a verification device. The mobile device 41 performs essentially the same capturing and processing steps as described in connection with the registration device 37. In particular it captures an image of the seal 1 using optical sensor means 42 directed at the seal 1. From the at least one captured image it determines the serial number 36 and the present values β', γ' of the parameters describing the physical structure of the first predetermined breaking point 31. The mobile device 41 in a transmission step 43 transmits a message 44 comprising the determined serial number together with the parameter values β', γ' to the central database 41 for verification. Alternatively the reference parameter values β, γ may be downloaded to the mobile device 41 for verification, with the downside that a potential attacker may use this information for forging the seal. In the present use-case the seal 1 is fully intact. The central database 40 compares the received parameter values β', γ' with the reference parameter values β, γ and determines a match in both parameters. It therefore performs a confirmation step 45 and sends a confirmation message 46 to the mobile device 41, which can be displayed as a confirmation notification 47 to a user of the mobile device 41, signaling the integrity of the verified seal 1.

Figure 7:
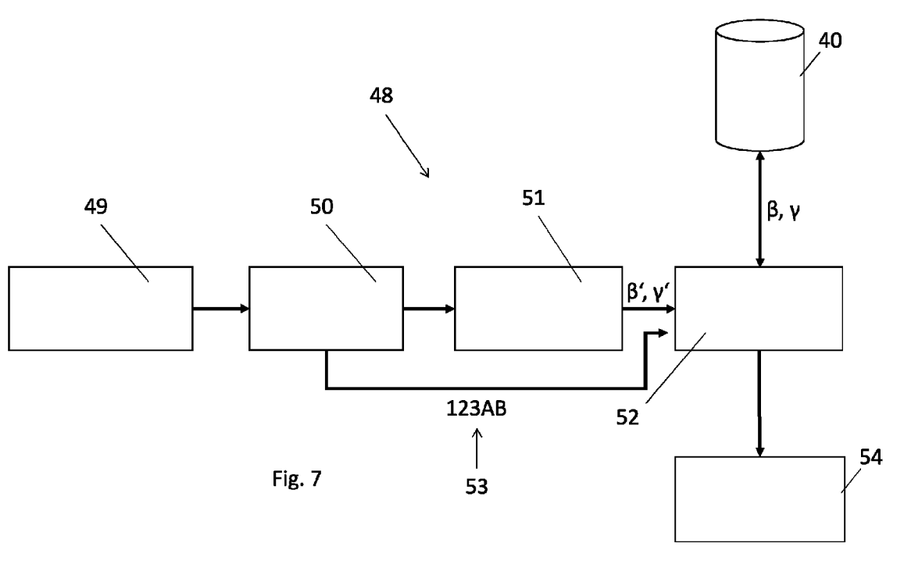
FIG. 7 schematically shows the structure of a system and of a computer program product for performing a seal integrity verification.

In FIG. 7 the elements of a preferred embodiment of the present system 48 are shown together with their connections. The system 48 for confirming the integrity of a tamper-evident seal 1 according to FIG. 7 comprises an input interface 49 (e.g. a keyboard or touch display interface) and a capturing means 50 connected to and controlled via the input interface 49. The capturing means 50 is further connected to a computing means 51 and a verification means 52. In this example, the capturing means 50 is configured to directly determine a serial number 53 of a seal 1 from at least one image captured by the capturing means 50 and transmits the serial number to the verification means 52. Moreover the computing means 51 is configured to receive captured image data of at least one image from the capturing means 50 and determine the values β', γ' of parameters describing the physical structure of a predetermined breaking point of a seal 1. The computing means 51 is configured to transmit the determined values β', γ' to the verification means 52. The verification means 52 is connected to a central database 40 and configured to receive the reference values β, γ of the parameters from the central database 40 and to compare the received reference values β, γ with the received determined values β', γ'. When the verification means 52 finds a match of the compared parameters, i.e. when preferably all compared parameters differ only within an acceptable range or error, it confirms the integrity of the seal 1 and transmits a confirmation message to an output interface 54 of the system 48.

The system is preferably implemented by a mobile device and a hosted service. The mobile device comprises the input interface 49, the output interface 54 and the capturing means 50. The hosted service comprises the central database 40 and the verification means 52. The verification means 52 as well as the computing means 51 can be either part of the mobile device or of the hosted service, depending on the computational effort necessary to determine the relevant parameters from the captured image. One advantage of this configuration is that the reference parameter values and/or parameter extraction algorithms are not exposed or accessible from outside the hosted service. Therefore a party seeking to forge the integrity of the seal cannot reproduce the seal state based on the reference parameter values and has significantly higher effort in re-engineering computation and used parameters.

The above-described embodiments concern predetermined breaking points formed by perforations and notches mainly because these types of predetermined breaking points are relatively easy to display. However the general principles of the present teaching do apply to less visible types of predetermined breaking points in the same manner and with similar advantages. For improved detection, any types of predetermined breaking points can be accompanied by graphical indications on the seal, which serve as guidance for identifying the relevant area of the seal when determining the parameter describing the physical structure of the predetermined breaking point.

The invention claimed is:

1. A method for confirming an integrity of a tamper-evident seal, comprising:
   capturing at least one image of the seal;
   determining a first parameter value of a first parameter describing physical structure of the seal from the at least one captured image;
   comparing the determined first parameter value with a pre-determined first reference parameter value;
   confirming the integrity of the seal when the compared parameter values match;
   wherein the first parameter describes physical structure of a predetermined breaking point provided in the seal,
   wherein before capturing an image of the seal, the pre-determined breaking point is produced in the seal according to a predefined value of the first parameter describing physical structure of the predetermined breaking point,
   wherein the predefined value is stored as the first reference parameter value for comparison with the determined first parameter value describing the physical structure of a predetermined breaking point.

2. The method according to claim 1, wherein a second reference parameter value is recorded for each seal by:
   capturing at least one reference image of the seal;
   determining the second reference parameter value of a second parameter describing physical structure of the seal from the at least one captured reference image;
   storing the determined second reference parameter value and after capturing at least one image of the seal:
     determining together with the first parameter value a second parameter value of the second parameter from the at least one captured image;
     comparing the determined second parameter value with the stored second reference parameter value;

confirming the integrity of the seal responsive to finding a match between the determined first and second parameter values and their respective reference parameter value.

3. The method according to claim 2, wherein the second parameter describes a position of the predetermined breaking point relative to at least one marking on the seal or on an object, when the seal is applied to said object.

4. The method according to claim 2, wherein the predetermined breaking point comprises a perforation provided in the seal and the second parameter describes the physical structure of the perforation.

5. The method according to claim 4, wherein the second parameter includes one or more of a length of the perforation, a width of the perforation, an offset of the perforation with respect to an edge of the seal, or a code embedded in the structure of the perforation.

6. The method according to claim 2, wherein the second reference parameter value is associated with an identification of the seal or a sealed object and stored in a central database, from which the second reference parameter value is fetched based on said identification before confirming the integrity of the seal.

7. The method according to claim 1, wherein the predetermined breaking point comprises a perforation provided in the seal and the first parameter describes the physical structure of the perforation.

8. The method according to claim 7, wherein the first parameter includes one or more of a length of the perforation, a width of the perforation, an offset of the perforation with respect to an edge of the seal, or a code embedded in the structure of the perforation.

9. The method of claim 8 wherein the first parameter includes a code embedded in the structure of the perforation by a sequence of long and short cuts.

10. The method of claim 1 wherein the predetermined breaking point is the only viable position for cutting the seal.

11. The method of claim 1 wherein the predetermined breaking point is designed such that the seal has an increased fragility at the predetermined breaking point.

12. The method of claim 1 wherein the first parameter comprises a plurality of parameters.

13. A method for confirming an integrity of a tamper-evident seal, comprising:
capturing at least one image of the seal;
determining a parameter value of a parameter describing physical structure of the seal from the at least one captured image;
comparing the determined parameter value with a pre-determined reference parameter value;
confirming the integrity of the seal when the compared parameter values match;
wherein the parameter describes physical structure of a predetermined breaking point provided in the seal,
wherein the predetermined breaking point comprises a perforation provided in the seal and the parameter describes the physical structure of the perforation,
wherein the parameter includes a code embedded in the structure of the perforation.

14. The method of claim 13, wherein the code is embedded in the structure of the perforation by a sequence of long and short cuts.

15. A method for confirming an integrity of a tamper-evident seal, comprising:
capturing at least one image of the seal;
determining a parameter value of a parameter describing physical structure of the seal from the at least one captured image;
comparing the determined parameter value with a pre-determined reference parameter value;
confirming the integrity of the seal when the compared parameter values match;
wherein the parameter describes physical structure of a predetermined breaking point produced in the seal,
wherein the predetermined breaking point comprises a perforation provided in the seal and the parameter describes the physical structure of the perforation,
wherein the parameter includes an offset of the perforation with respect to an edge of the seal.

16. A system for confirming an integrity of a tamper-evident seal, comprising
an image capturing device and a computer connected to the image capturing device,
wherein the computer is configured to receive at least one captured image from the image capturing device and determine a code embedded in the structure of a perforation of a predetermined breaking point provided in the seal from the at least one captured image,
the system further comprising a verifier configured to receive the determined code and compare the determined code with a pre-determined reference code and confirm the integrity of the seal when the compared codes match.

17. The system according to claim 16, wherein the computer is configured to determine a position of the predetermined breaking point relative to at least one marking on the seal or on an object, when the seal is applied to said object, from the at least one captured image.

18. The system device according to claim 16, wherein the computer is configured to determine an offset of the perforation with respect to an edge of or marker on the seal from the at least one captured image.

19. The system according to claim 16, wherein the image capturing device and optionally the computer is/are part(s) of a mobile device and the verifier is separate from the mobile device and the mobile device comprises a communicator connected to the computer and configured to establish a connection to the verifier via a data network, wherein the verifier is configured to receive the reference code from a central database.

* * * * *